US010717597B2

(12) United States Patent
Shek

(10) Patent No.: US 10,717,597 B2
(45) Date of Patent: Jul. 21, 2020

(54) LID BODY

(71) Applicant: Michael Shek, San Mateo, CA (US)

(72) Inventor: Michael Shek, San Mateo, CA (US)

( * ) Notice: Subject to any disclaimer, the term of this patent is extended or adjusted under 35 U.S.C. 154(b) by 602 days.

(21) Appl. No.: 15/429,505

(22) Filed: Feb. 10, 2017

(65) Prior Publication Data

US 2018/0229930 A1 Aug. 16, 2018

(51) Int. Cl.
*H02P 1/04* (2006.01)
*B65F 1/16* (2006.01)

(52) U.S. Cl.
CPC .......... *B65F 1/1638* (2013.01); *B65F 1/1607* (2013.01); *B65F 2210/128* (2013.01); *B65F 2210/168* (2013.01)

(58) Field of Classification Search
CPC ......... H02K 7/116; B65F 1/1607; E05F 15/73
USPC ........................................ 318/139, 16; 49/13
See application file for complete search history.

(56) References Cited

U.S. PATENT DOCUMENTS 7,750,591 B2 * 7/2010 Wang .................... B65F 1/1607 318/16
2013/0081329 A1 * 4/2013 French .................... E05F 15/73 49/13

FOREIGN PATENT DOCUMENTS

CN 203001462 * 6/2013
CN 206528889 * 1/2017
TW M317423 8/2007

* cited by examiner

*Primary Examiner* — Eduardo Colon Santana
*Assistant Examiner* — Zemenay T Truneh
(74) *Attorney, Agent, or Firm* — Muncy, Geissler, Olds & Lowe, P.C.

(57) ABSTRACT

A lid body is provided, and the lid body includes a main body and an opening and closing system. The opening and closing system is disposed on the main body and includes a lid member, a processing unit, an opening unit, a timing unit, a display unit and a driving unit, the lid member is movably assembled on the main body and optionally covers the opening, the timing unit is set for a preset time, when the lid member moves to the opening position and uncovers the opening, the timing unit starts to count; in the meanwhile, the display unit simultaneously shows a timing state of the timing unit; and after the timing unit counts to the preset time, the driving unit drives the lid member to move to a position where the lid member covers the opening completely.

9 Claims, 6 Drawing Sheets

LID BODY

BACKGROUND OF THE INVENTION

Field of the Invention

The present invention relates to a lid body of a container.

Description of the Prior Art

Usually, a lid member of a simple container covers on a barrel body, so when a user wants to put an object into the barrel body or take the object out from the barrel body, s/he needs to move the lid member with hand; therefore, when the container is served as a trash can, the user's hand easily becomes dirty. To improve this kind of problems, a lid body is provided, the user only needs to press an opening member, and then the lid member will open automatically so as to prevent from touching the lid body with hand. Recently, an inductive lid body is provided, the lid member of the inductive lid body can sense if an item approaches and open automatically, so the user does not need to lift the lid member with hand. This type of lid body is disclosed in TWM317423.

In this type of lid body, the lid member closes automatically in a preset time to cut off the communication between the barrel body and outside so as to make sure that no unexpected foreign matters enter the barrel body and that odor of garbage will not disseminate to outside when the lid body is served as the trash can. However, the user does not know a closing timing of the lid member; therefore, the lid member often hits the hand of the user or the object, and a structure of the lid member may be damaged and the hand of the user may be injured.

The present invention has arisen to mitigate and/or obviate the afore-described disadvantages.

SUMMARY OF THE INVENTION

The major object of the present invention is to provide a lid body which has a display unit for showing a timing when a lid member is going to cover the opening, and a user can see when the lid member is going to close so as to prevent from being hit by the lid member.

To achieve the above and other objects, a lid body is provided for being assembled on a barrel body and defining a receiving space with the barrel body, and the lid body includes a main body and an opening and closing system. The main body has an opening for communicating with the receiving space. The opening and closing system is disposed on the main body and includes a lid member, a processing unit, an opening unit, a timing unit, a display unit and a driving unit, the lid member is movably assembled on the main body and optionally covers the opening, the opening unit and the timing unit are respectively electrically connected to the processing unit, the timing unit and the display unit are electrically connected to each other, the driving unit is electrically connected to and between the processing unit and the lid member, the opening unit is for being triggered from outside of the lid body to transmit a signal to the processing unit, as the processing unit receives the signal and transmits an actuating signal to the driving unit, the driving unit drives the lid member to move to an opening position where the lid member uncovers the opening. The timing unit is set for a preset time, and when the lid member moves to the opening position, the timing unit starts to count; in the meanwhile, the display unit simultaneously shows a timing state of the timing unit; and after the timing unit counts to the preset time, the processing unit controls the driving unit to drive the lid member to move to a position where the lid member covers the opening completely.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
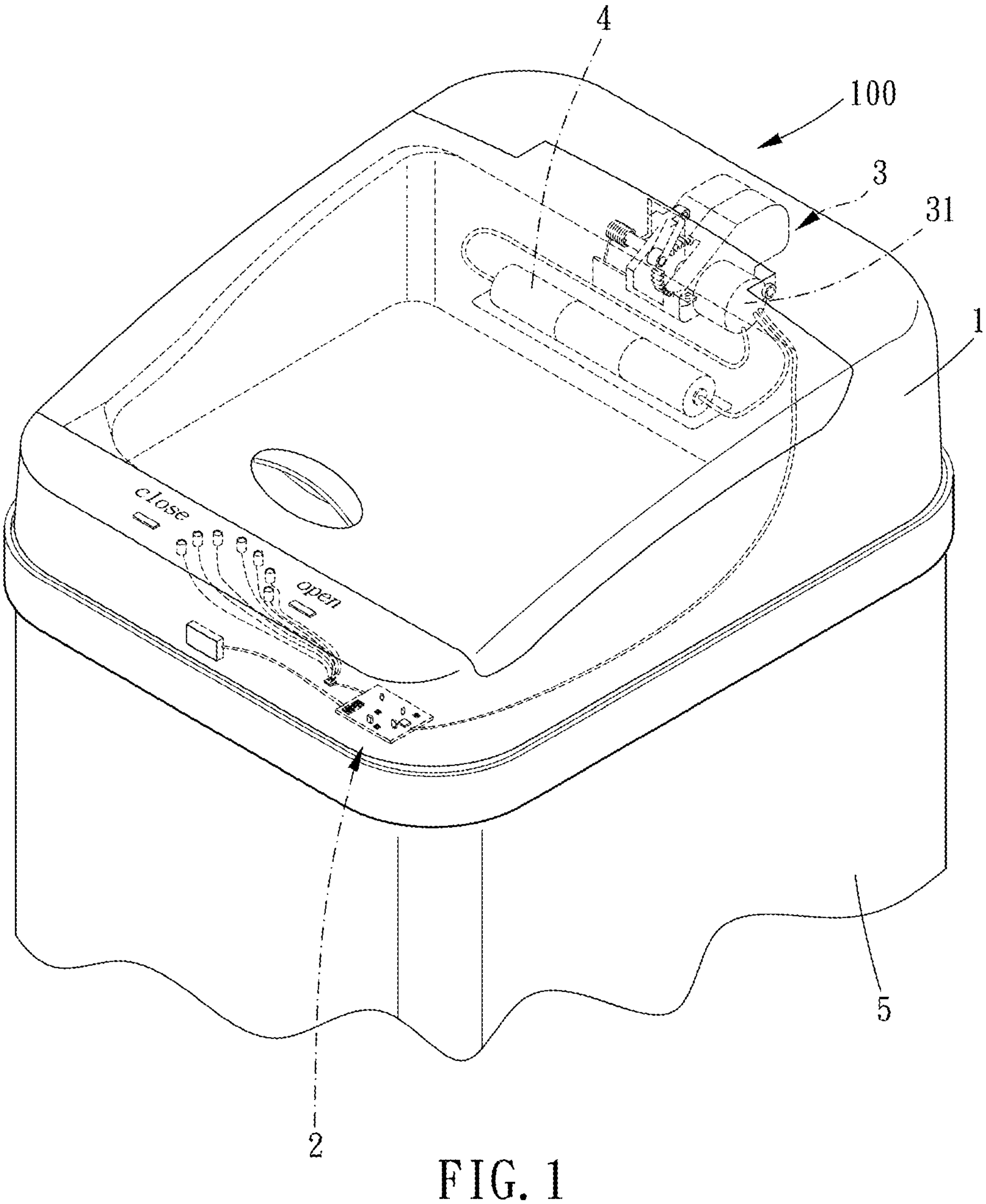
FIG. 1 is a stereogram of an embodiment of the present invention.
Figure 2:
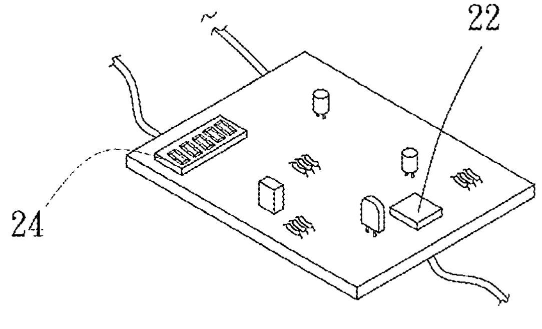
FIG. 2 is a partially-enlarged view of FIG. 1.
Figure 3:
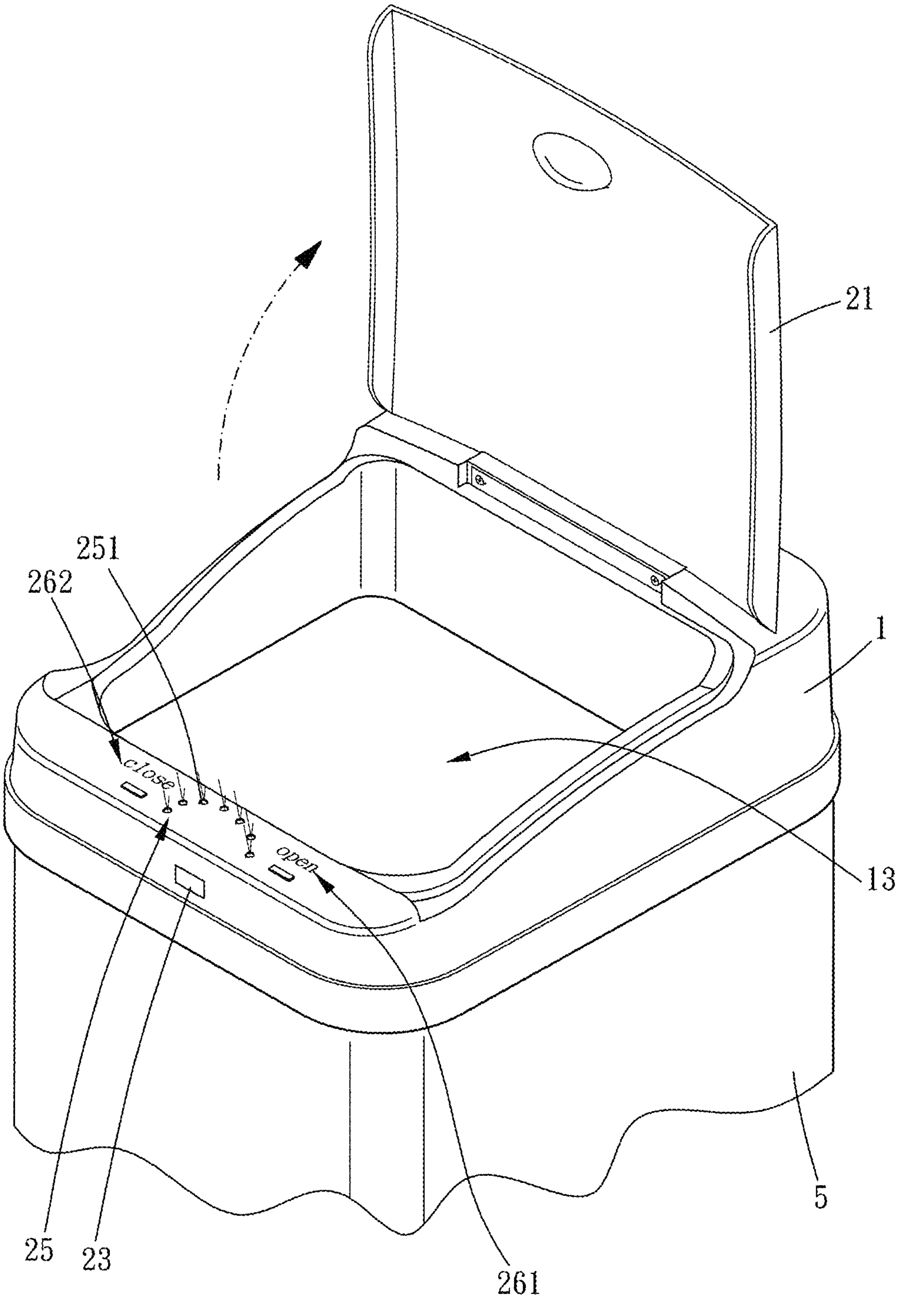
FIGS. 3 to 5 are drawings showing movements of a lid member covering an opening.
Figure 4:
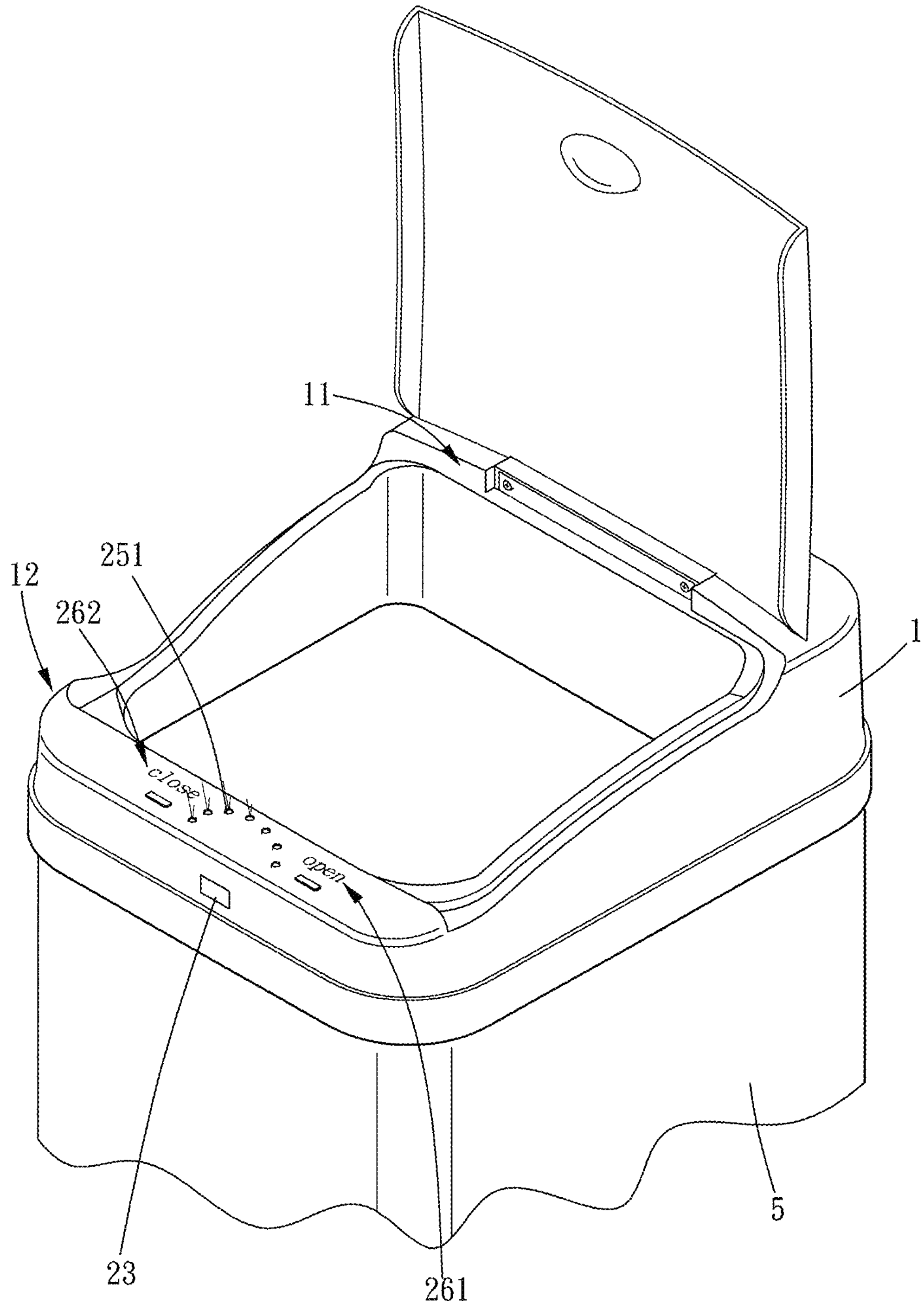
Figure 5:
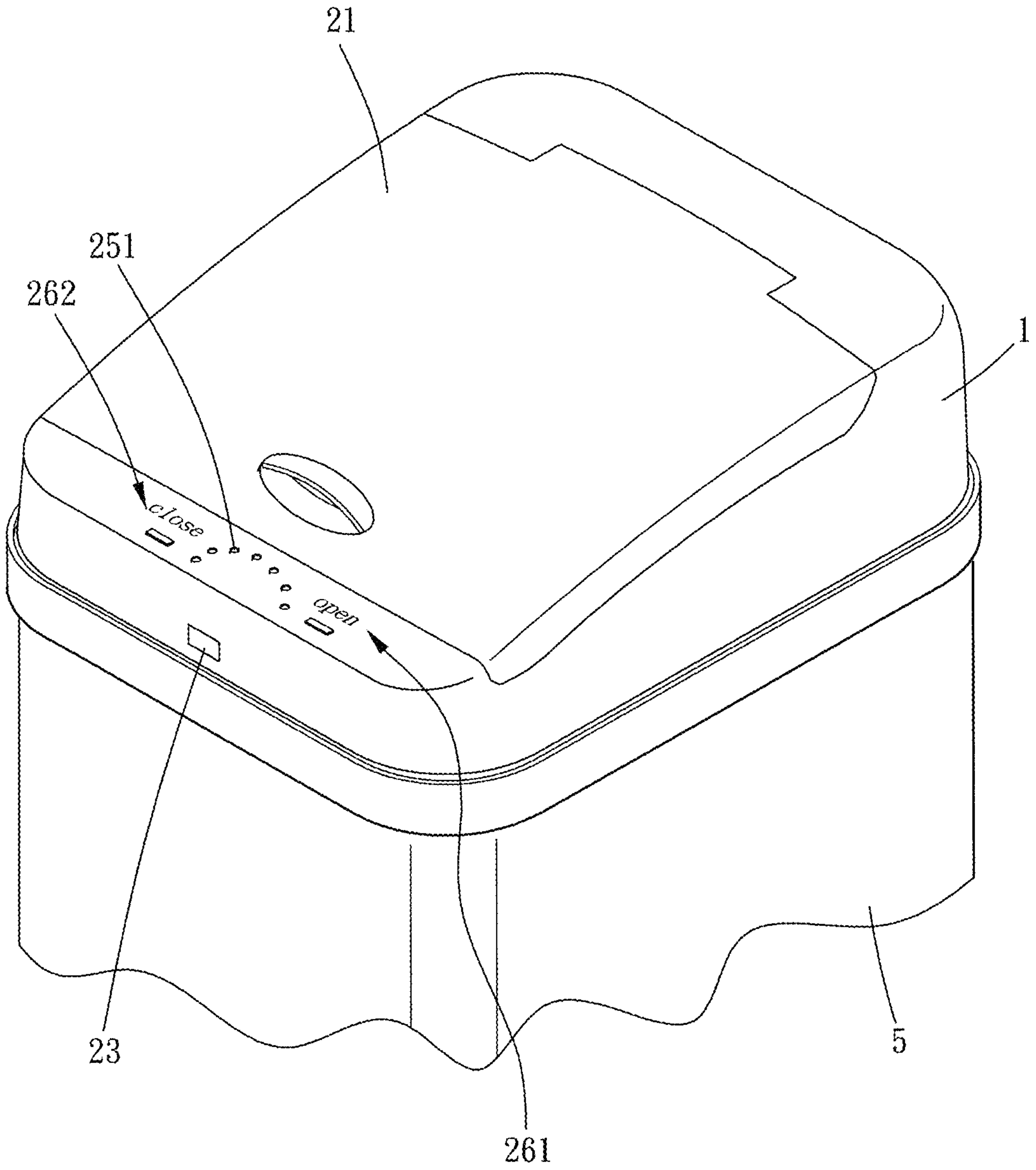
Figure 6:
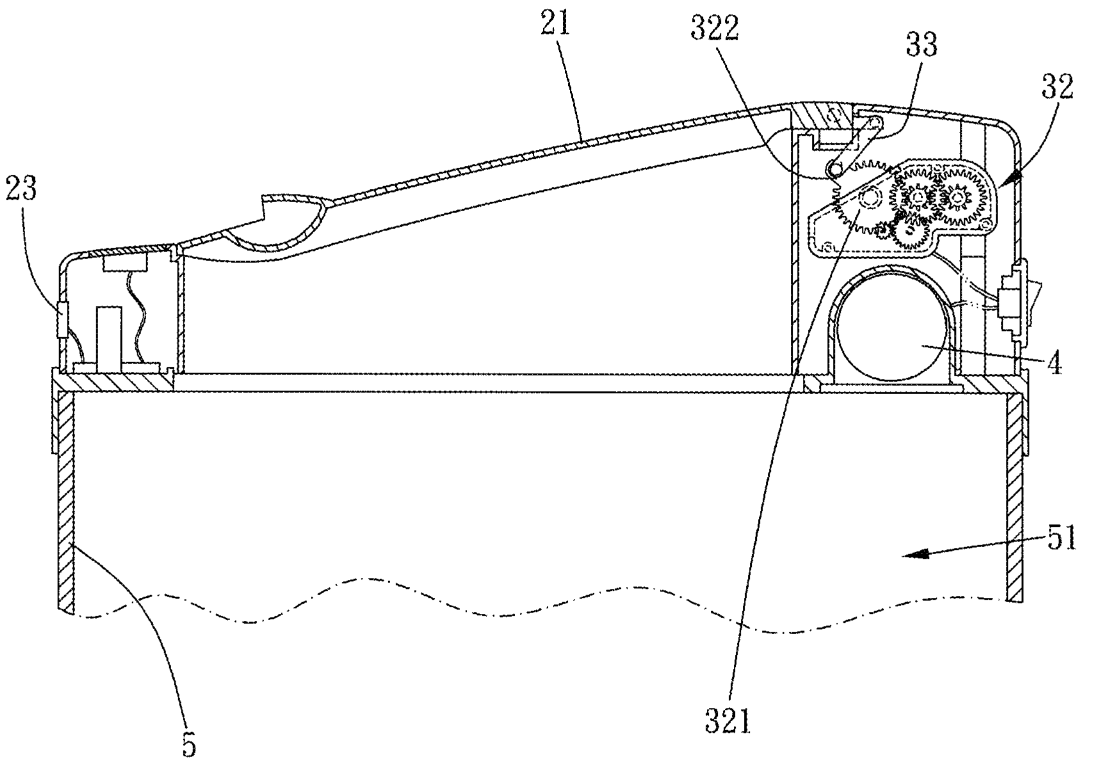
FIG. 6 is a cross-sectional side view of FIG. 1.

The present invention will be clearer from the following description when viewed together with the accompanying drawings, which show, for purpose of illustrations only, the preferred embodiment in accordance with the present invention.

Please refer to FIGS. 1 to 6 for an embodiment of the present invention. A lid body 100 of the present invention is for being assembled on a barrel body 5 and defining a receiving space 51 with the barrel body 5, and the lid body includes a main body 1 and an opening and closing system 2.

Specifically, the main body 1 has an opening 13 for communicating with the receiving space 51. The opening and closing system 2 is disposed on the main body 1 and includes a lid member 21, a processing unit 22, an opening unit 23, a timing unit 24, a display unit 25 and a driving unit 3, the lid member 21 is movably assembled on the main body 1 and optionally covers the opening 13, the opening unit 23 and the timing unit 24 are respectively electrically connected to the processing unit 22, the timing unit 24 and the display unit 25 are electrically connected to each other, and the driving unit 3 is electrically connected to and between the processing unit 22 and the lid member 21.

The opening unit 23 is for being triggered from outside of the lid body to transmit a signal to the processing unit 22, as the processing unit 22 receives the signal and transmits an actuating signal to the driving unit 3, and the driving unit 3 drives the lid member 21 to move to an opening position where the lid member 21 uncovers the opening 13. At this moment, a user can put items through the opening 13 into the receiving space 51 or take items out from the receiving space 51. It is to be noted that the opening unit 23 is a sensor; specifically, the opening unit 23 is a distance sensor for detecting if an object approaches, and the opening unit 23 may be, for example, an optical sensor, a magnetic sensor, a sound sensor or an ultrasonic sensor.

Of course, the opening unit 23 may also be a pressure sensor for sensing a pressure of the user pressing thereon. For example, the pressure sensor may serve as a button, when a first button is pressed, the lid member 21 is controlled to open and uncover the opening 13, and the lid member 21 closes automatically when the preset time (for example, five minutes) is reached; or a second button may be added, and when the second button is pressed, the lid member 21 closes immediately.

More specifically, the timing unit 24 is set for a preset time, when the lid member 21 moves to the opening position, the timing unit 24 starts to count; in the meanwhile, the display unit 25 simultaneously shows a timing state of the timing unit 24; and after the timing unit 24 counts to the preset time, the processing unit 22 controls the driving unit 3 to drive the lid member 21 to move to a position where the lid member 21 covers the opening 13 completely so as to cut off the communication between the barrel body 5 and outside. Therefore, the lid member 21 can prevent unexpected items from entering the barrel body 5, and when the barrel body 5 is served as a trash can, the lid member 21 can prevent odor of garbage in the barrel body 5 from disseminating to outside.

It is to be noted that the user can know a closing timing of the lid member 21 by watching the display unit 25 so that s/he can take objects out or place objects in before the lid member 21 starts to move to close the opening 13. Therefore, a process of the lid member 21 covering the opening 13 can be conducted smoothly, hands the user will not be injured by the lid member 21, and objects will not collide with the lid member 21 and damage a structure of the lid member 21. In addition, in reality, the time needed to take out objects or place in objects may be prolonged due to many unexpected factors, for example, there is a large number of objects, or objects are stuck together and hard to take out; therefore, the preset time is preferably 60 seconds to 360 seconds so that the user has more buffering time.

More specifically, in this embodiment, the display unit 25 includes a plurality of light-emitting members 251, when the timing unit 24 starts to count, the plurality of light-emitting members 251 act along an acting direction sequentially with an intermittent time between two actions, and the intermittent time is defined as the preset time divided by a number of the plurality of light-emitting members 251. Please refer to FIGS. 3 to 5, for example, the preset time is 140 seconds, and the number of the plurality of light-emitting members 251 is seven; under the circumstances, the intermittent time is 20 seconds, and when the lid member 21 moves to the opening position, the plurality of light-emitting members 251 are all in a light-on state, and the plurality of light-emitting members 251 switch to a light-off state sequentially along the acting direction as time goes by. In other words, every 20 seconds, one of the light-emitting members 251 switches to the light-off state, and after all the light-emitting members 251 switch to the light-off state, the processing unit 22 controls the driving unit 3 to drive the lid member 21 to move to the position where the lid member 21 covers the opening 13 completely. Therefore, the user only needs to watch the number of the light-emitting members 251 which are in the light-on state to know when the driving unit 3 drives the lid member 21 to cover the opening 13.

Preferably, the display unit 25 further includes a first marking portion 261 and a second marking portion 262, the first marking portion 261 indicates that the lid member 21 is in the opening position, and the second marking portion 262 indicates that the lid member 21 is in the position where the lid member 21 covers the opening 13 completely so that it is easier for the user to determine the meaning of the plurality of light-emitting members 251 acting along the acting direction. Specifically, a connecting direction of the first marking portion 261 toward the second marking portion 262 is the acting direction. More preferably, the first and second marking portions 261, 262 are texts so that the user can understand indications of the first and second marking portions 261, 262, for example, in this embodiment, the first marking portion 261 is "open", and the second marking portion 262 is "close".

Figure 7:
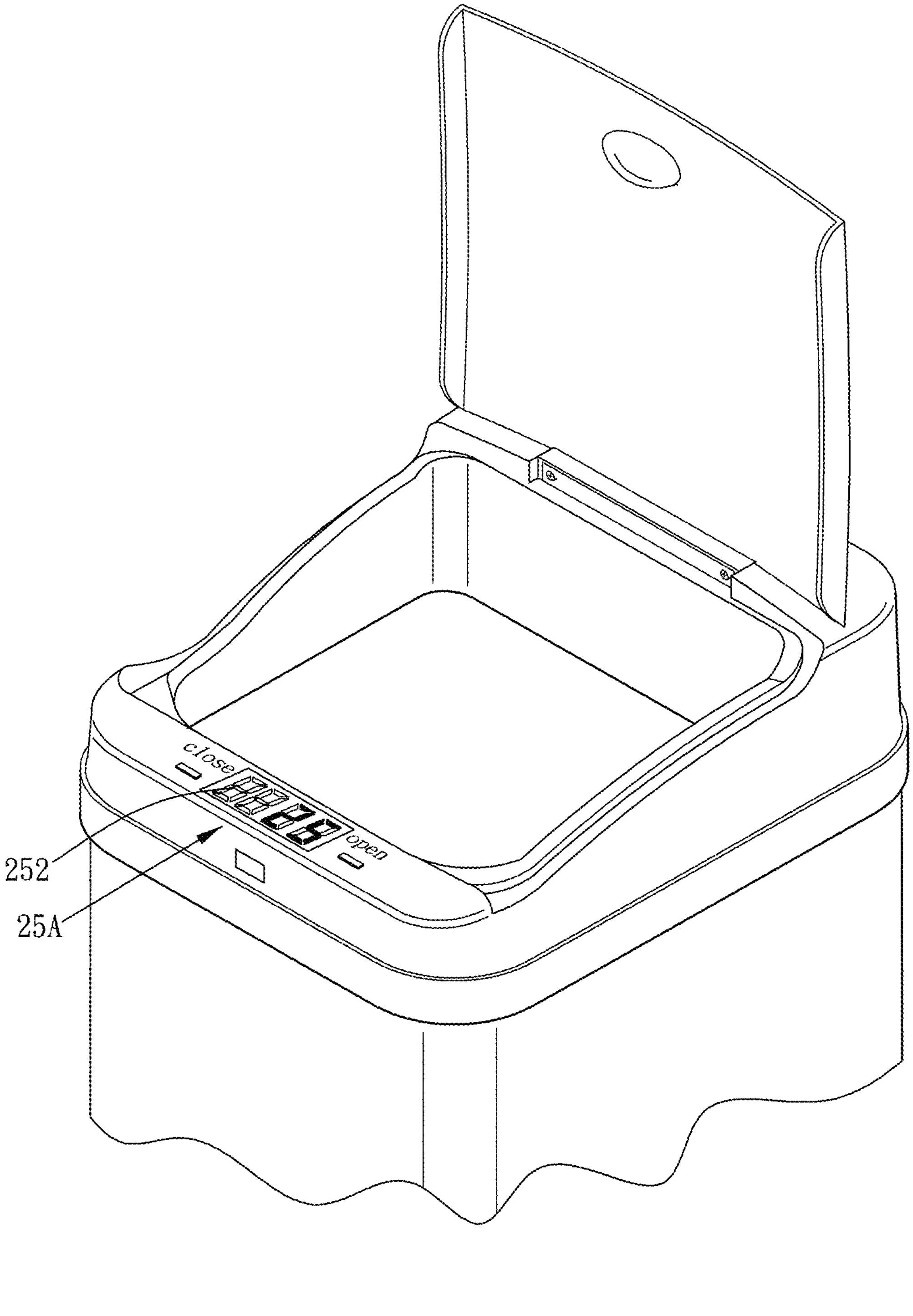
FIG. 7 is a stereogram of another embodiment of the present invention.

In addition, as shown in another embodiment of FIG. 7, a display unit 25A is a display panel 252, and the display panel 252 is configured to display time changes of the timing unit.

Please further refer to FIGS. 1 to 6 for this embodiment, the lid member 21 is pivoted to a first side portion 11 of the main body 1, the display unit 25 is disposed on a second side portion 12 of the main body 1, and the first and second side portions 11, 12 face each other. The driving unit 3 is assembled on the first side portion 11 to drive the lid member 21 quickly. More specifically, the driving unit 3 includes a motor 31 and a decelerating gear set 32, the motor 31 comoves with the decelerating gear set 32, the decelerating gear set 32 has a distal end gear 321, the distal end gear 321 extends radially to form a protrusive block 322, a linkage 33 is pivoted with and between the protrusive block 322 and the lid member 21, and when the motor 31 starts, the decelerating gear set 32 is driven to rotate to make the protrusive block 322 drive the linkage 33 to move and further make the lid member 21 swing relative to the main body 1.

Moreover, the lid body further includes a power supply unit 4, and the power supply unit 4 is disposed in the main body 1 and electrically connected to the processing unit 22 and the driving unit 3. Preferably, the power supply unit 4 is a battery box assembly which can immediately supply power at any time and place.

Given the above, in the lid body, the display unit allows the user to know exactly when the lid member is going to close so that during the process of the lid member coving the opening, the lid member will not collide with the user or objects. In other words, the lid body can ensure that the lid member functions smoothly without interferences of the user or objects.

While we have shown and described various embodiments in accordance with the present invention, it should be clear to those skilled in the art that further embodiments may be made without departing from the scope of the present invention.

What is claimed is:

1. A lid body, assembled on a barrel body and defining a receiving space with the barrel body, the lid body including:

a main body, having an opening for communicating with the receiving space;

an opening and closing system, disposed on the main body, including a lid member, a processing unit, an opening unit, a timing unit, a display unit and a driving unit, the lid member being movably assembled on the main body and optionally covering the opening, the opening unit and the timing unit being respectively electrically connected to the processing unit, the timing unit and the display unit being electrically connected to each other, the driving unit being electrically connected to the processing unit and disposed on one side of the lid member, the opening unit for being triggered from outside of the lid body to transmit a signal to the processing unit, as the processing unit receives the signal and transmits an actuating signal to the driving unit, the driving unit drives the lid member to move to an opening position where the lid member uncovers the opening;

wherein the timing unit is set for a preset time, when the lid member moves to the opening position, the timing unit starts to count; in the meanwhile, the display unit simultaneously shows a timing state of the timing unit;

and after the timing unit counts to the preset time, the processing unit controls the driving unit to drive the lid member to move to a position where the lid member covers the opening completely;

wherein the driving unit includes a motor and a decelerating gear set, the motor comoves with the decelerating gear set, the decelerating gear set has a distal end gear, the distal end gear extends radially to form a protrusive block, a linkage is pivoted with and between the protrusive block and the lid member, and when the motor starts, the decelerating gear set is driven to rotate to make the protrusive block drive the linkage to move and further make the lid member swing relative to the main body.

2. The lid body of claim 1, wherein the opening unit is a sensor.

3. The lid body of claim 1, wherein the lid member is pivoted to a first side portion of the main body, the display unit is disposed on a second side portion of the main body, and the first and second side portions face each other.

4. The lid body of claim 1, wherein the display unit is a display panel, and the display panel is for displaying time changes of the timing unit.

5. A lid body, assembled on a barrel body and defining a receiving space with the barrel body, the lid body including:

a main body, having an opening for communicating with the receiving space;

an opening and closing system, disposed on the main body, including a lid member, a processing unit, an opening unit, a timing unit, a display unit and a driving unit, the lid member being movably assembled on the main body and optionally covering the opening, the opening unit and the timing unit being respectively electrically connected to the processing unit, the timing unit and the display unit being electrically connected to each other, the driving unit being electrically connected to the processing unit and disposed on one side of the lid member, the opening unit for being triggered from outside of the lid body to transmit a signal to the processing unit, as the processing unit receives the signal and transmits an actuating signal to the driving unit, the driving unit drives the lid member to move to an opening position where the lid member uncovers the opening;

wherein the timing unit is set for a preset time, when the lid member moves to the opening position, the timing unit starts to count; in the meanwhile, the display unit simultaneously shows a timing state of the timing unit; and after the timing unit counts to the preset time, the processing unit controls the driving unit to drive the lid member to move to a position where the lid member covers the opening completely;

wherein the display unit includes a plurality of light-emitting members, when the timing unit starts to count, the plurality of light-emitting members act along an acting direction sequentially with an intermittent time between two actions, and the intermittent time is defined as the preset time divided by a number of the plurality of light-emitting members.

6. The lid body of claim 5, wherein when the lid member moves to the opening position, the plurality of light-emitting members are all in a light-on state, as time passes, the plurality of light-emitting members switch to a light-off state sequentially along the acting direction, and after the plurality of light-emitting members are all in the light-off state, the processing unit controls the driving unit to drive the lid member to move to the position where the lid member covers the opening completely.

7. The lid body of claim 5, wherein the display unit further includes a first marking portion and a second marking portion, the first marking portion indicates that the lid member is in the opening position, the second marking portion indicates that the lid member is in the position where the lid member covers the opening completely, and a connecting direction of the first marking portion toward the second marking portion is the acting direction.

8. The lid body of claim 7, wherein the first and second marking portions are texts.

9. The lid body of claim 8, wherein the driving unit includes a motor and a decelerating gear set, the motor comoves with the decelerating gear set, the decelerating gear set has a distal end gear, the distal end gear extends radially to form a protrusive block, a linkage is pivoted with and between the protrusive block and the lid member, and when the motor starts, the decelerating gear set is driven to rotate to make the protrusive block drive the linkage to move and further make the lid member swing relative to the main body; the opening unit is a sensor; the lid member is pivoted to a first side portion of the main body, the display unit is disposed on a second side portion of the main body, and the first and second side portions face each other; when the lid member moves to the opening position, the plurality of light-emitting members are all in a light-on state, as time passes, the plurality of light-emitting members switch to a light-off state sequentially along the acting direction, and after the plurality of light-emitting members are all in the light-off state, the processing unit controls the driving unit to drive the lid member to move to the position where the lid member covers the opening completely; the preset time is 60 to 360 seconds; the lid body further includes a power supply unit, the power supply unit is disposed in the main body and electrically connected to the processing unit and the driving unit, and the power supply unit is a battery box assembly; the first marking portion is "open", and the second marking portion is "close".

* * * * *